(12) United States Patent
Ogawa et al.

(10) Patent No.: US 7,505,067 B2
(45) Date of Patent: Mar. 17, 2009

(54) DIGITAL CAMERA WITH CAMERA SHAKE COMPENSATION

(75) Inventors: Takahiro Ogawa, Saitama (JP); Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 715 days.

(21) Appl. No.: 11/159,156

(22) Filed: Jun. 23, 2005

(65) Prior Publication Data
US 2005/0285949 A1    Dec. 29, 2005

(30) Foreign Application Priority Data
Jun. 24, 2004    (JP)    ............... P2004-186499

(51) Int. Cl.
H04N 5/228    (2006.01)

(52) U.S. Cl. ............... 348/208.99; 348/208.2; 348/208.4; 348/234; 348/251; 396/52; 396/53; 396/55; 359/554

(58) Field of Classification Search ........... 348/251
See application file for complete search history.

(56) References Cited

U.S. PATENT DOCUMENTS

| | | | |
|---|---|---|---|
| 5,172,233 A * | 12/1992 | Yoshihara et al. ......... 348/208.1 |
| 5,266,988 A | 11/1993 | Washisu |
| 5,974,269 A | 10/1999 | Sato et al. |
| 2003/0067544 A1 | 4/2003 | Wada |
| 2004/0032952 A1* | 2/2004 | Pinto et al. ............... 380/54 |
| 2004/0201707 A1* | 10/2004 | Noguchi et al. .......... 348/208.7 |
| 2006/0087707 A1* | 4/2006 | Akaho ................... 358/518 |

FOREIGN PATENT DOCUMENTS

| | | |
|---|---|---|
| JP | 63-99680 | 4/1988 |
| JP | 63-217778 | 9/1988 |
| JP | 8-304868 | 11/1996 |
| JP | 10-142647 | 5/1998 |
| JP | 10-142649 | 5/1998 |
| JP | 11-72815 | 3/1999 |
| JP | 2001-117129 | 4/2001 |
| JP | 2002-229090 | 8/2002 |
| JP | 2003-110919 | 4/2003 |

OTHER PUBLICATIONS

U.S. Appl. No. 11/044,010, to Uenaka et al., filed Jan. 28, 2005.
U.S. Appl. No. 11/044,055, to Uenaka et al., filed Jan. 28, 2005.

(Continued)

Primary Examiner—Nhan T. Tran
Assistant Examiner—Cynthia Calderon
(74) Attorney, Agent, or Firm—Greenblum & Bernstein, P.L.C.

(57) ABSTRACT

A digital camera having a camera-shake compensation mechanism and a luminance compensation processor is provided. The camera-shake compensation mechanism compensates for a camera-shake by adjusting a relative relation between positions of an optical axis of a photographing optical system and a center of an image of an imaging device. The luminance compensation processor compensates for luminance information of pixels of the imaging device, which are outside an image circle of the photographing optical system during a camera-shake compensation operation performed by the camera-shake compensation mechanism.

7 Claims, 8 Drawing Sheets

OTHER PUBLICATIONS

U.S. Appl. No. 11/044,054, to Uenaka, filed Jan. 28, 2005.
U.S. Appl. No. 11/065,577, to Uenaka, filed Feb. 25, 2005.
U.S. Appl. No. 11/065,354, to Uenaka et al., filed Feb. 25, 2005.
U.S. Appl. No. 11/073,638, to Uenaka et al., filed Mar. 8, 2005.
U.S. Appl. No. 11/073,604, to Uenaka, filed Mar. 8, 2005.
U.S. Appl. No. 11/071,234, to Uenaka, filed Mar. 4, 2005.
U.S. Appl. No. 11/071,220, to Uenaka et al., filed Mar. 4, 2005.
U.S. Appl. No. 11/071,241, to Uenaka, filed Mar. 4, 2005.
U.S. Appl. No. 11/071,242, to Uenaka, filed Mar. 4, 2005.
U.S. Appl. No. 11/078,367, to Seo, filed Mar. 14, 2005.
U.S. Appl. No. 11/108,868, to Uenaka et al., filed Apr. 19, 2005.
U.S. Appl. No. 11/115,315, to Seo, filed Apr. 27, 2005.
U.S. Appl. No. 11/139,625, to Uenaka et al., filed May 31, 2005.
U.S. Appl. No. 11/139,633, to Uenaka et al., filed May 31, 2005.
U.S. Appl. No. 11/140,731, to Seo, filed Jun. 1, 2005.
U.S. Appl. No. 11/140,966, to Seo, filed Jun. 1, 2005.
English Language Abstract of JP63-217778.
English Language Abstract of JP63-99680.
English Language Abstract of JP10-142649.
English Language Abstract of JP11-72815.
English Language Abstract of JP2001-117129.
English Language Abstract of JP2002-229090.
English Language Abstract of JP2003-110919.
English Language Abstract of JP10-142647.
English Language Abstract of JP 8-304868.

* cited by examiner

DIGITAL CAMERA WITH CAMERA SHAKE COMPENSATION

BACKGROUND OF THE INVENTION

1. Field of the Invention

The present invention relates to a digital camera provided with camera-shake compensation functionality (anti-shake functionality).

2. Description of the Related Art

Conventionally, some digital cameras are provided with camera-shake compensation functionality. In a conventional camera-shake compensation operation (or a blur compensation operation) of the camera-shake compensation functionality, a camera-shake (a direction and the quantity of the camera-shake) of the digital camera, for example, is obtained by using a gyro-sensor. A solid-state imaging device (e.g., CCD) or a compensation optical system (which is a part of a photographing optical system) is then moved to counterbalance the detected camera-shake. Thereby, the camera-shake that results from hand-held shake and the like are compensated, and a satisfactory image is obtained.

SUMMARY OF THE INVENTION

In general, the solid-sate imaging device is placed at a position where the center of an effective area of the solid-sate imaging device is concentric with the center of an image circle of the photographing optical system, and the photographing optical system is also optically designed in order to include the effective area of the solid-sate imaging device within the image circle. Here, the image circle is defined as an outermost circular area that is able to receive light more than a predetermined quantity of light (for example, 50 percent or more) compared to the quantity of light received on the-optical axis of the photographing optical system. Namely, outside the image circle of an optical image formed by the photographing optical system, the luminance and sharpness are substantially low compared to the luminance and sharpness obtained within the image circle.

However, when the solid-sate imaging device or the compensation optical system is operated in accordance with the above-described camera-shake compensation operation, the relative relations between the image circle position and the solid-sate imaging sensor position change, thereby a part of the solid-sate imaging device occasionally exceeds the range of the image circle. As described above, since the luminance of the optical image outside the image circle is low, the quality of an image deteriorates although a blur of the image is compensated.

In order to overcome the above problem, making the image circle substantially large enough to keep the solid-sate imaging device within the image circle even when relative relations between the photographing optical system and the solid-state imaging device are varied during the camera-shake compensation, has been contemplated. However, in order to enlarge the size of the image circle, the dimensions of the photographing optical system should also be increased, thereby this approach runs against the trend to reduce camera size.

An object of the present invention is to reduce the size of a digital camera provided with camera-shake compensation functionality.

According to the present invention, a digital camera is provided that comprises a camera-shake compensation mechanism and a luminance compensation processor.

The camera-shake compensation mechanism compensates for a camera-shake by adjusting a relative relation between positions of an optical axis of a photographing optical system and a center of an image of an imaging device. The luminance compensation processor compensates for luminance information of pixels of the imaging device, which are located outside an image circle of the photographing optical system during a camera-shake compensation operation performed by the camera-shake compensation mechanism.

For example, the luminance compensation processor comprises a detecting processor and a luminance information amplifier. The detecting processor counts the number of times each of the pixels is determined as being outside the image circle in the camera-shake compensation operation. This is repeated every predetermined period by the camera-shake compensation mechanism during an electric-charge accumulating period of the imaging device. The luminance information amplifier amplifies the luminance information of the pixels based on factors that are obtained for each of the pixels in accordance with the number of times each of the pixels is determined as being outside the image circle, which is counted by the detecting processor.

The detecting processor may comprise a distance calculator, a comparator, and a determination processor. The distance calculator calculates a distance from a center of the image circle to a pixel of the imaging device. The comparator compares the distance calculated by the distance calculator and a radius of the image circle. The determination processor determines whether the pixel is positioned outside the image circle in accordance with a result of a comparison carried out by the comparator.

The camera-shake compensation mechanism may comprise a camera shake-detector and a drive mechanism. The camera-shake detector detects the quantity of a camera-shake. The drive mechanism moves the imaging device in a plane perpendicular to the optical axis, so that the camera-shake detected by the camera-shake detector is counterbalanced.

For example, the luminance compensation processor compensates the luminance information with respect to the time that each of the pixels has been outside an image circle of the photographing optical system during a camera-shake compensation operation, performed by the camera-shake compensation mechanism.

Further, the luminance compensation processor may also compensate the luminance information with respect to the distance from the optical axis to a pixel of the imaging device, when the imaging device is moved by the camera-shake compensation operation.

Further, according to the present invention, a digital camera is provided that comprises a camera-shake compensation mechanism, a calculator, and a luminance compensation processor.

The camera-shake compensation mechanism compensates for a camera-shake by moving an imaging device with respect to an optical axis of a photographing optical system. The calculator calculates a distance from the optical axis to a pixel of the imaging device when the imaging device is moved by a camera-shake compensation operation of the camera-shake compensation mechanism. The luminance compensation processor compensates for luminance information of the pixel based on the distance calculated by the calculator.

Furthermore, according to the present invention, a luminance compensation method is provided. The method comprises steps of detecting a distance from an optical axis to a pixel of an imaging device while the imaging device is moved by a camera-shake compensation operation performed by a camera-shake compensation mechanism of a digital camera, and compensating for the luminance of the pixel by amplifying the luminance value in accordance with the distance.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiments shown in the drawings.

Figure 1:
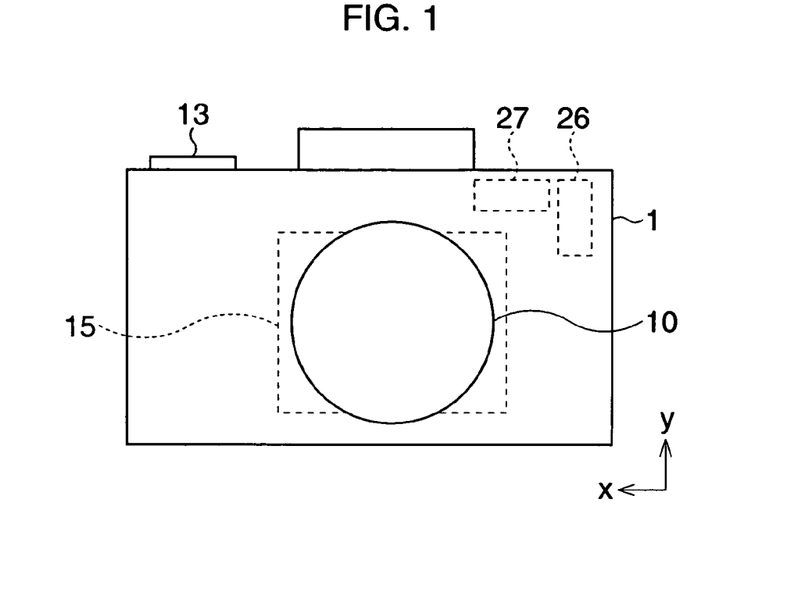
FIG. 1 is a front view of a digital camera to which an embodiment of the present invention is applied.
Figure 2:
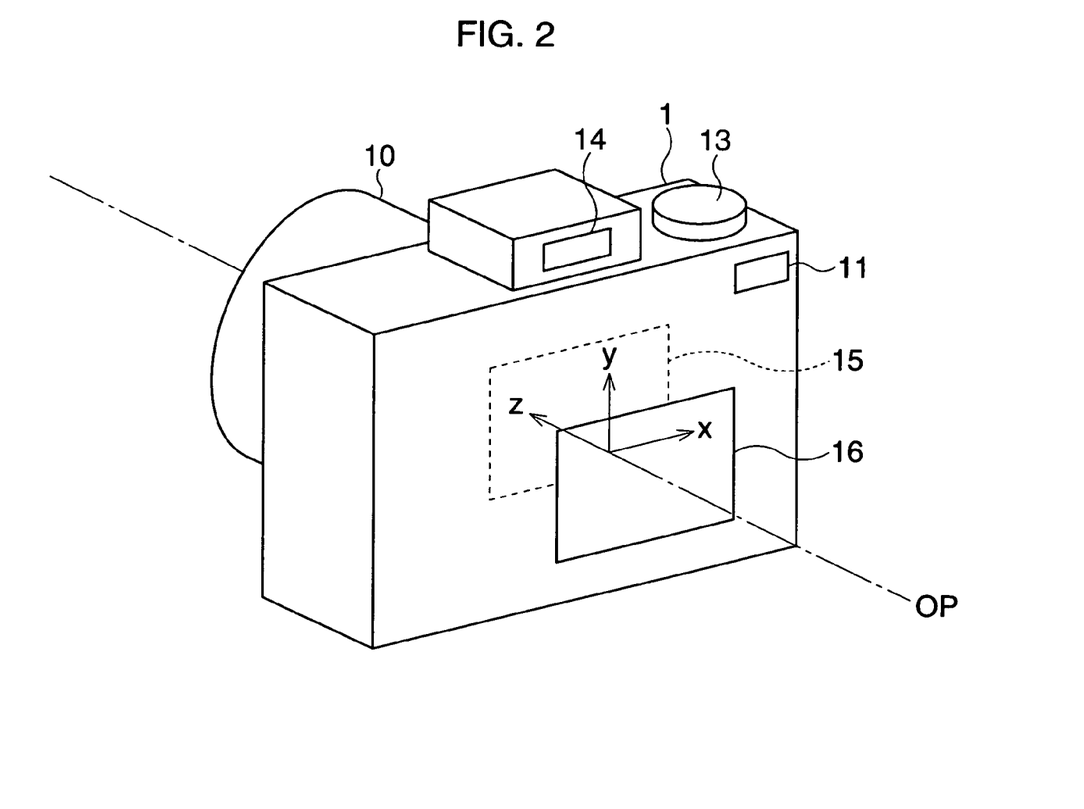
FIG. 2 is a perspective view of the digital camera shown in FIG. 1.

FIG. 1 is a front view of a digital camera to which an embodiment of the present invention is applied. FIG. 2 is a perspective view from the rear side of the digital camera shown in FIG. 1. A power button (Pon) 11 is provided on the rear side of the digital camera 1, and is used to control the On/Off state of the camera. On the top face, a release button 13 is provided. Reflected light from an object comes into the digital camera 1 through a photographing lens 10, so that an image of the object is formed on an imaging surface of a CCD (which will be described later). Image data obtained by the CCD is subjected to a predetermined image processing and then reproduced on an LCD 16, which is provided on the rear side of the digital camera 1. Further, a start and an end of the camera-shake compensation operation are controlled by an operation of an anti-shake button 14.

Note that, in the present embodiment, a first direction "x" is defined as a direction that is perpendicular to an optical axis "OP" of the photographing optical system, and further the first direction "x" corresponds to a horizontal direction when the digital camera 1 is held in the normal position. A second direction "y" is defined as a direction perpendicular to the optical axis "OP" and to the first direction "x", so that the second direction "y" corresponds to a vertical direction when the digital camera 1 is held in the normal position. Further, a third direction "z" coincides with the optical axis "OP".

Inside the digital camera 1, a first angular velocity sensor 26 and a second angular velocity sensor 27 are provided. The first angular velocity sensor 26 is a sensor for detecting the angular velocity about the y-axis (the axis along the second direction "y"). The second angular velocity sensor 27 is a sensor for detecting the angular velocity about the x-axis (the axis along the first direction "x"). A gyroscope sensor is an example of the first and second angular velocity sensor 26 and 27.

Figure 3:
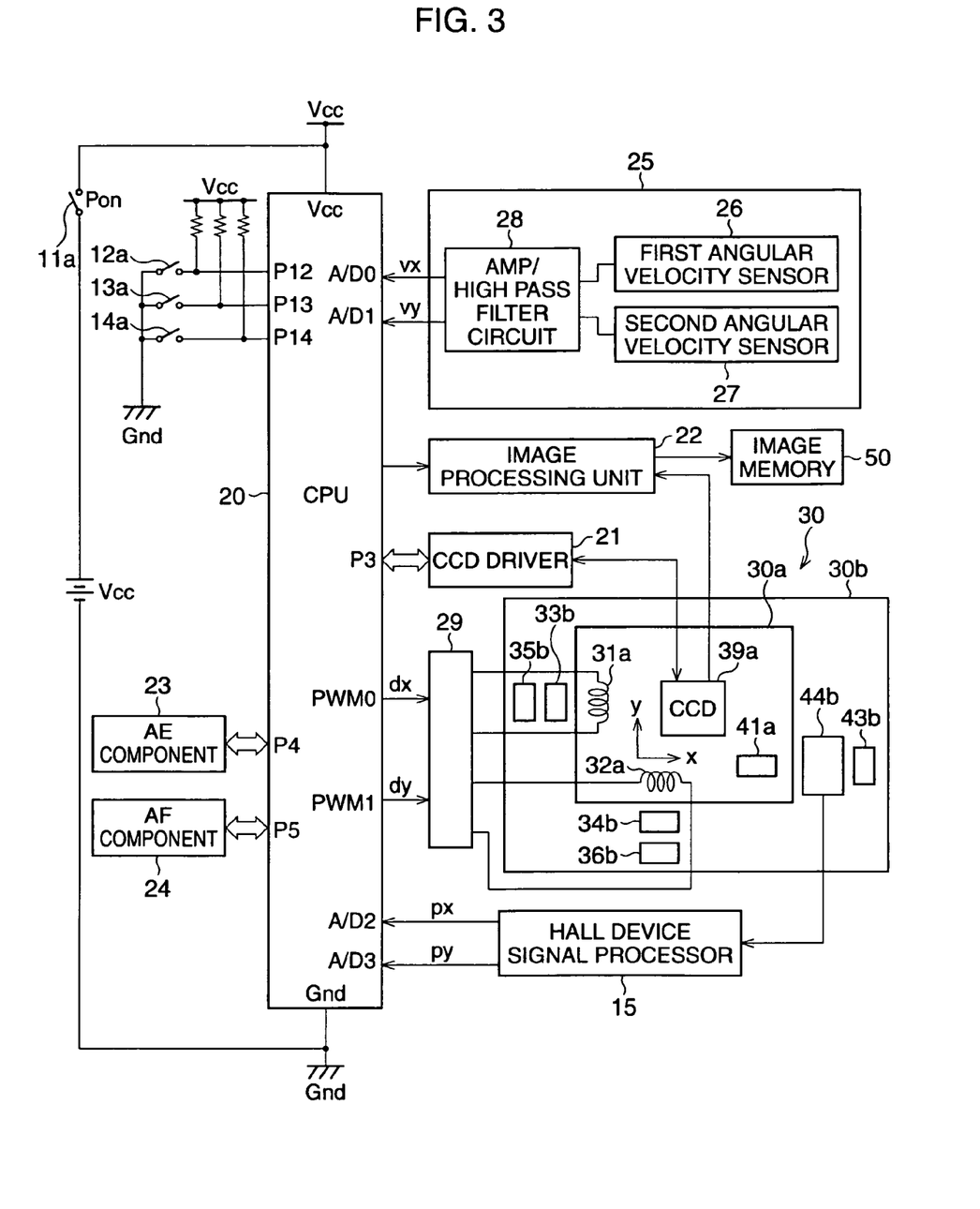
FIG. 3 is a block diagram of the digital camera.

FIG. 3 is a block diagram of the digital camera 1. A switch 11a is switched on and switched off in connection with an operation of the power button (Pon) 11. When the switch 11a is turned on, the electrical power is then supplied to all of the circuits in the digital camera 1.

When the release button 13 is half depressed, a photometry switch 12a is turned on and a photometry process starts. Further, when the release button 13 is fully depressed, a release switch 13a is turned on so that an image capturing process starts. An anti-shake switch 14a is switched On and switched Off in connection with an operation of the anti-shake button 14. A camera-shake compensation operation, which will be described later, starts when the anti-shake switch 14a is switched on and ends when the anti-shake switch 14a is switched off.

An AE component 23 carries out a photometry operation for an object, so that an exposure value is calculated, and a stop value and exposure time (electric-charge accumulating period), which are required for the image capturing operation, are calculated from the exposure value. An AF component 24 carries out a distance measurement so that the digital camera 1 is brought into focus by moving the photographing lens 10 along the optical axis "OP" in accordance with a result of the measurement.

When the above-described release switch 13a is turned On, control signals from a CPU 20 are output to a CCD driver 21. Further, CCD drive signals are fed to the CCD 39a from the CCD driver 21, in accordance with the control signals from the CPU 20. Namely, an optical image formed on the imaging surface of the CCD 39a through the photographing lens 10 is subjected to photoelectrical conversion so that image data is output from the CCD 39a. The image data from the CCD 39a is then subjected to A/D conversion and predetermined image processing in an image-processing unit 22, and is then stored in an image memory 50.

An angular velocity detecting component 25 includes the first angular velocity sensor 26, the second angular velocity sensor 27, and an amplifier/high-pass filter circuit 28. Each of the first and second angular velocity sensors 26 and 27 detects angular velocity components about the y-axis and the x-axis for every regular interval (e.g., 1 ms). The amplifier/high-pass filter circuit 28 amplifies signals relating to the angular velocity components and then cuts off null voltage and removes a panning component of the first and second angular velocity sensor 26 and 27, and finally outputs the amplified and filtered analog signals to terminals A/D0 and A/D1 of the CPU 20, as a first and second angular velocity components "vx" and "vy".

The analog signals of the first and second angular velocity components "vx" and "vy", which are input from the terminals A/D0 and A/D1 of the CPU 20, are converted to the digital signals in the CPU 20. Further, the signals are subjected to an integral process, so that the quantity of the camera-shake which is induced during the regular interval (1 ms), is calculated by using a transformation coefficient, which takes the focus length and so on into consideration. Namely, displacement in the first direction "x" of the digital camera 1 is calculated in accordance with the output from the first angular velocity sensor 26. Further, displacement in the second direction "y" of the digital camera 1 is calculated in accordance with the output from the second angular velocity sensor 27.

The CPU 20 calculates coordinates of a position S, where the CCD 39a ought to be moved and which corresponds to the above-calculated quantity of the camera-shake, for each of the first direction "x" and the second direction "y". In the present embodiment, a coordinate value of the position S in the first direction "x" is referred to as "sx", and a coordinate value in the second direction "y" is referred to as "sy". The motion of a movable section 30a, including the CCD 39a, is performed by electromagnetic force, as described later. Further, the movement of the movable section 30a to the position P is carried out by an actuator driver 29, which is controlled by signals of a first PWM-duty "dx" and a second PWM-duty "dy". The first PWM-duty "dx" controls the motion in the first direction "x" and the second PWM-duty "dy" controls motion in the second direction "y". Namely, the first and second PWM-duty "dx" and "dy" correspond to the components of the drive force applied to the movable section 30a, in the first and second directions "x" and "y".

An anti-shake device 30 is a device that compensates for a camera-shake, by moving the CCD 39a to the above-calculated position S, in order to counteract a shake of the digital camera 1 induced by the hand-held shake. The anti-shake device 30 comprises the movable section 30a that includes the CCD 39a and a fixed portion 30b. The movable section 30a is designed to move within a movable area. The movable section 30a is supported by a support mechanism (not shown) so as to be movable in the first direction "x" and the second direction "y".

The motion in the first direction "x" of the movable section 30a of the anti-shake device 30 is carried out by an actuator that is comprised of a first drive coil 31a provided on the movable section 30a, and a first drive magnet 33b and a first drive yoke 35b provided on the fixed portion 30b. Further, the movement in the second direction "y" of the movable section 30a of the anti-shake device 30 is carried out by an actuator that is comprised of a second drive coil 32a provided on the movable section 30a, and a second drive magnet 34b and a first drive yoke 36b provided on the fixed portion 30b. Namely, the motion of the movable section 30a is operated by controlling the directions and values of electric current supplied to the first and second drive coils 31a and 32a.

The first and second drive coils 31a and 32a are connected to the actuator driver 29. Therefore, the motion of the movable section 30a of the anti-shake device 30 is controlled by the actuator driver 29, which is controlled by a signal having the first PWM-duty "dx" from the terminal PWM0 of the CPU 20 and a signal having the second PWM-duty "dy" from the terminal PWM1 of the CPU 20.

The position P of the movable section 30a is detected by a Hall device 44b and a Hall device signal processor 45 which are used in cooperation with a position-sensing magnet 41a and position-sensing yoke 43b. The information of the detected position P is input to terminals A/D2 and A/D3 of the CPU 20. The information includes a first position signal "px" and a second position signal "py", as components of the first direction "x" and the second direction "y". The first and second position signals "px" and "py" are subjected to an A/D conversion through the terminals A/D2 and A/D3. A component of the position P in the first direction "x" after the A/D conversion is referred to as a variable "pdx", and a component of the position P in the second direction "y" after the A/D conversion is referred to as variable "pdy". The PID (proportional integral derivative) control is performed based on the data including the detected position P(pdx, pdy) and the objective position S(sx, sy), which indicates a destined position of the movable section 30.

Figure 4:
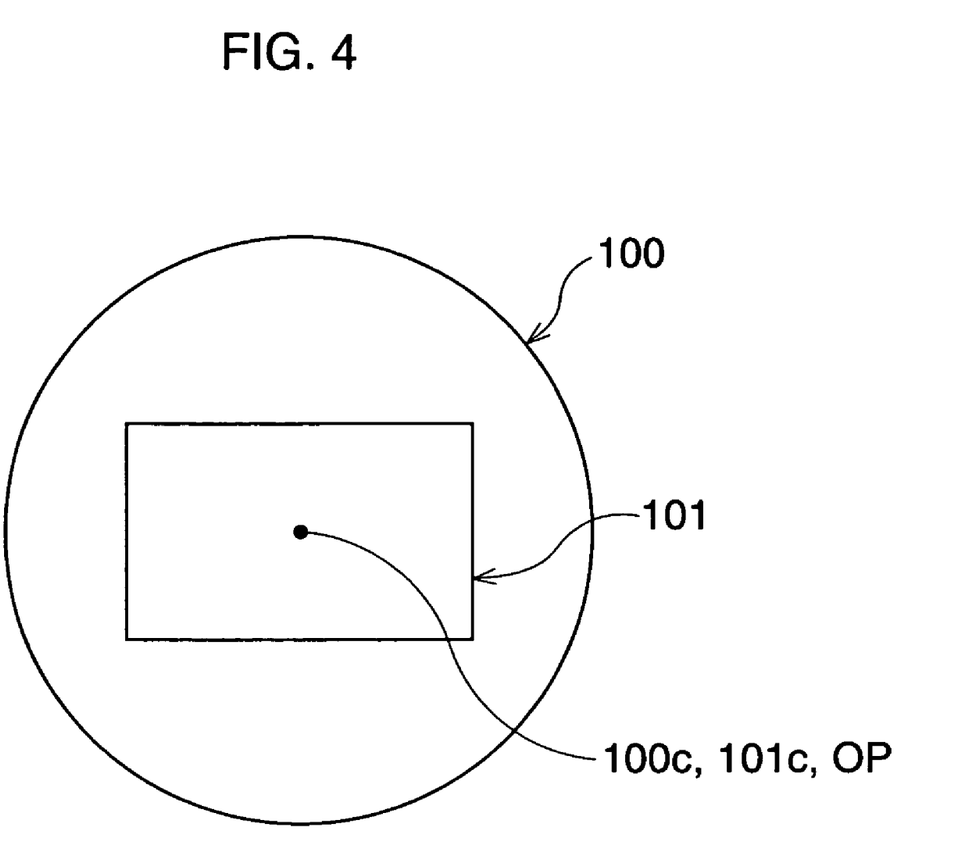
FIG. 4 schematically illustrates a relative relation between an image circle of a photographing lens and a CCD.

FIG. 4 schematically shows a relative relation between the image circle of the photographing lens 10 and the CCD 39a. The center of the image circle 100 is aligned with the optical axis "OP" of the photographing lens 10. The effective pixel area 101 is a rectangular area formed of the effective pixels of the CCD 39a. When the anti-shake switch 14a is in the OFF state and the camera-shake compensation functionality is at rest, the movable section 30a is placed at a position where the optical axis OP penetrates a center 101c of the effective pixel area 101. The center 101c is an intersection point between two diagonal lines of the effective pixel area 101. In the present embodiment, the position of the movable section 30a and the CCD 39a on this occasion is-referred to as "the center of motion". Further, the photographing lens 10 is optically designed so that the image circle 10 includes the effective pixel area 101 of the CCD 39a when the CCD 39a is positioned at the center of motion.

As described above, in the present embodiment, the camera-shake of the digital camera 1, which is induced by the hand-held shake, is eliminated by motion of the CCD 39a. Namely, the quantity of the anti-shake motion of the CCD 39a depends on the magnitude of the camera-shake. Thus, on some occasions, a part of the CCD 39a, i.e. some of the pixels of the CCD 39a, are outside the image circle 100 of the photographing optical system in accordance with the camera-shake. Accordingly, the CPU 20 carries out a luminance compensation operation (which will be detailed below) during an electric-charge accumulating period in order to compensate for luminance information of the pixels of the CCD 39a that are outside the image circle 100.

Figure 5:
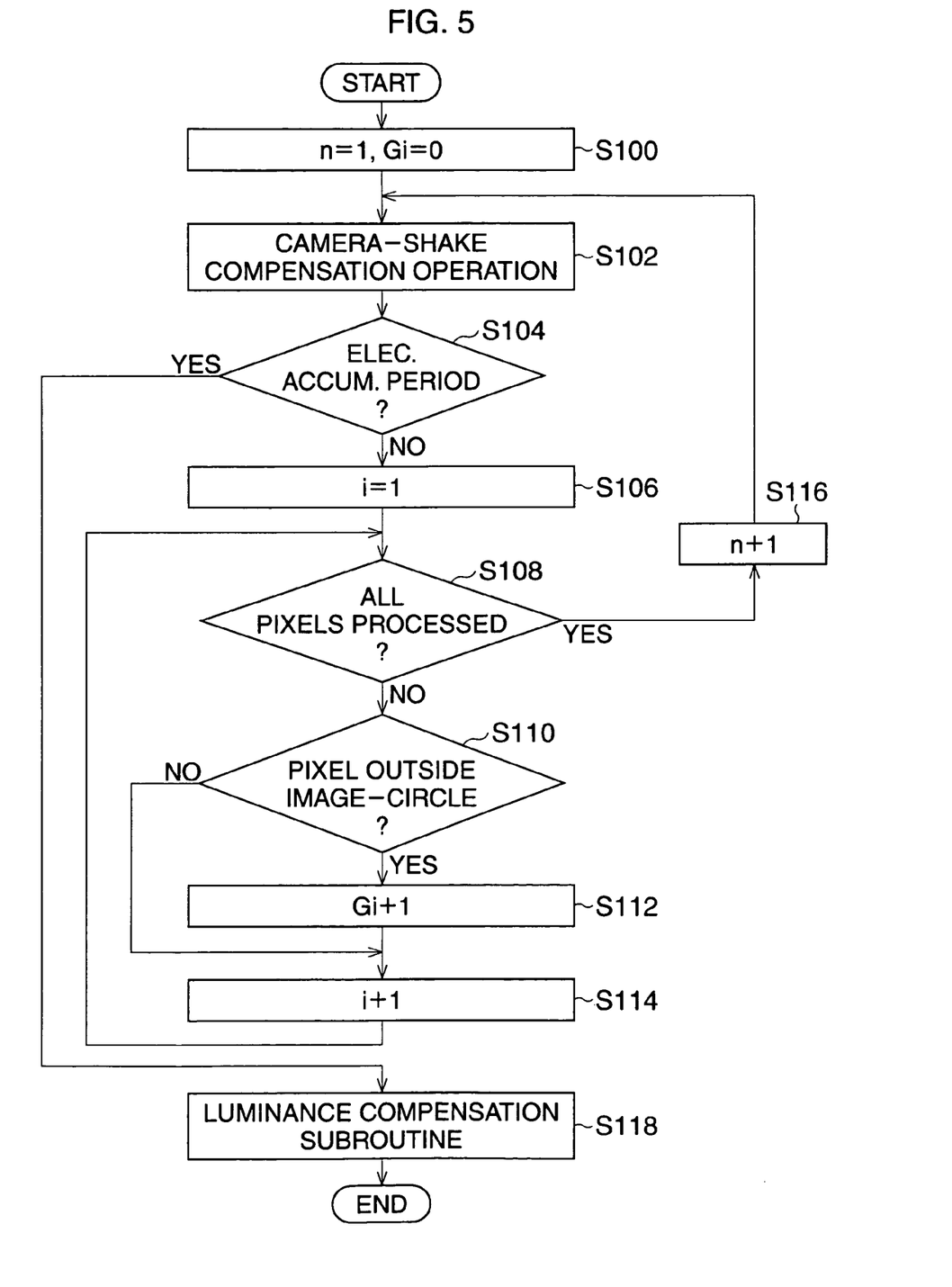
FIG. 5 is a flowchart of a luminance compensation operation.

FIG. 5 is a flowchart of the luminance compensation operation, which is carried out during an electric-charge accumulating period of the CCD 39a. The electric-charge accumulating period takes place when the release button 13 is fully depressed to turn on the release switch 13a and the image capturing process is started. In Step S100, a variable "n", which indicates the number of times the camera-shake compensation has been carried out, is preset as "1". Further, a variable "Gi" which is incremented each predetermined interval for each of the pixels and that indicates the amount of time each of the pixels is outside the image circle 100 during the electric-charge accumulating period, is preset to "0". Here the suffix "i" of the variable "Gi" corresponds to a variable "i" that identifies each of the effective pixels (which will be discussed later). Further, the variable "Gi" finally correlates with the total time in which each of the pixels has been outside the image circle 100 during the electric-charge accumulating period. In Step S102, the camera-shake compensation operation is then executed.

Figure 6:
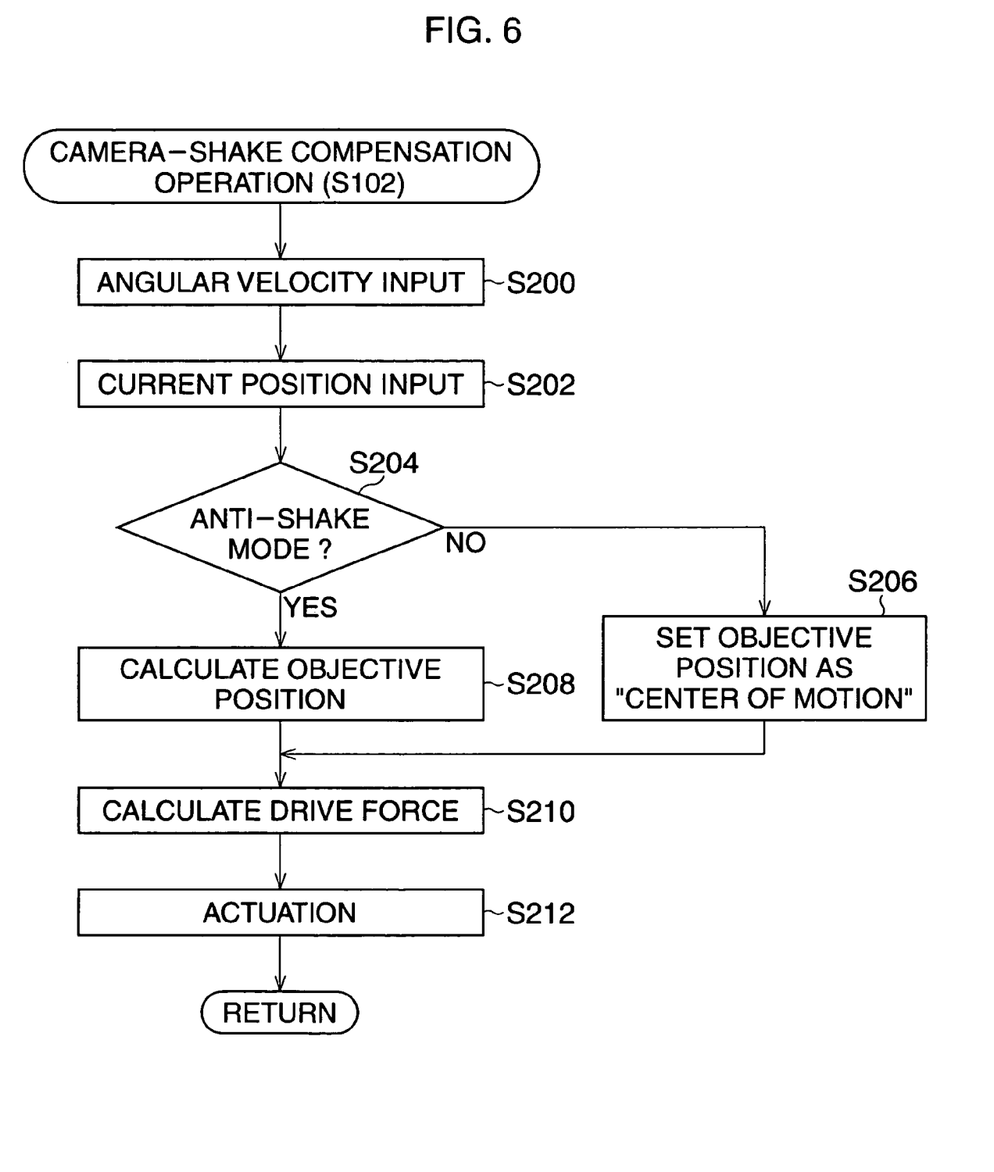
FIG. 6 is a flowchart of a camera-shake compensation operation.

FIG. 6 is a flowchart of the camera-shake compensation operation. In Step 200, the first and second angular velocity components "vx" and "vy", which are output from the angular velocity detecting component 25, are input to the CPU 20 through the terminals A/D0 and A/D1, and are converted to digital signals from analog signals. In step S202, the first and second position signals "px" and "py" of the movable section 30a, which are detected by the Hall device 44b and calculated by the Hall device signal processor 45, are input to the CPU 20 through the terminals A/D2 and A/D3 and are converted from analog signals to digital signals. Thereby, the current position P(pdx, pdy) is obtained.

In Step S204, the state of the anti-shake switch 14a is checked to determine whether the anti-shake mode has been set. When the anti-shake mode has not been set, the position S(sx, sy), which is an objective position of the movable section 30a to be moved, is set as the center of motion of the movable section 30a in Step S206. On the other hand, when the anti-shake mode has been set, the position S(sx, sy) of the movable section 30a is then calculated in Step S208 from the first and second angular velocity components "vx" and "vy", which are obtained in Step S200.

In Step S210, the drive force required for the movement of the movable section 30a is calculated from the position S(sx, sy) and the current position P(pdx, pdy), which were obtained in Step S206 and Step S208. Namely, the first PWM-duty "dx" and the second PWM-duty "dy", which are required for driving the first and second drive coil 31a and 32a, are calculated. In Step S212, the first drive coil 31a and the second drive coil 32a are driven by the actuator driver 29 in accordance with the first PWM-duty "dx" and the second PWM-duty "dy", so that the movable section 30a is actuated. The operations in Steps S210 and S212 are carried out by using a normal PID automatic control, which in general includes proportional, integral, and derivative calculations.

When the camera-shake compensation operation ends, the process returns to Step S102 of FIG. 5 and then proceeds to Step S104. In Step S104, whether an electric-charge accumulating period has elapsed is determined. The period is calculated by the CPU 20 when the release button 13 is half depressed and the photometry switch 12a is turned on. Whether the electric-charge accumulation period has elapsed is determined by-using the following Eq. (1).

$$n \cdot \Delta t \leq Ts \quad (1)$$

In Eq. (1), "Δt" denotes a period in which the camera-shake compensation operation is repeated and "Ts" denotes the electric-charge accumulating period. When it is determined that the electric-charge accumulating period has not passed, the process proceeds to Step S106.

In Step S106, the variable "i", which identifies each of the effective pixels and which indicates an effective pixel that is currently being subjected to a determination as to whether the effective pixel is outside the image circle 100, is preset to "1". The process then proceeds to Step S108, so that the variable "i" and the total number "M" of the effective pixels of the CCD 39a are compared. Namely, whether all of the effective pixels have been subjected to this process is checked. When the process has not been carried out for all of the effective pixels, the process proceeds to Step S110.

Figure 7:
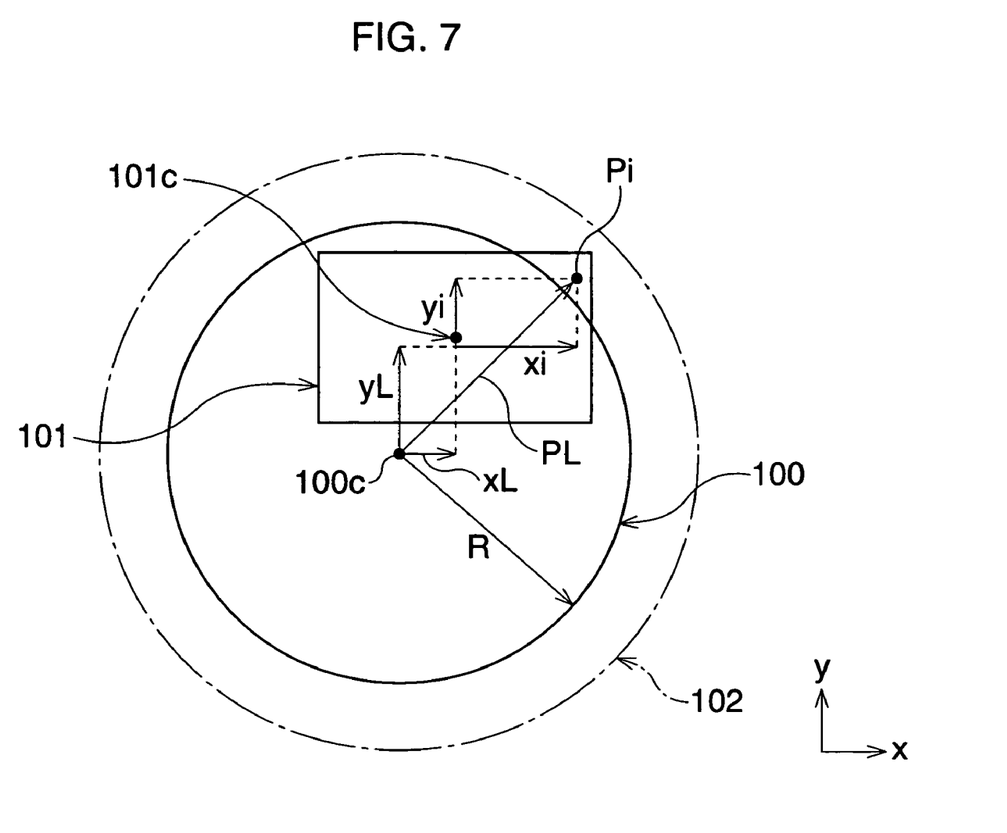
FIG. 7 schematically illustrates a relative relation between the image circle and the CCD, which is moved in the camera-shake compensation operation.

In Step S110, whether a pixel that is currently being processed is positioned outside the image circle 100 is determined. With reference to FIG. 7, a process of Step S110 is explained. The pixel "Pi" in FIG. 7 is a pixel that is currently being processed (the suffix "i" represents the above variable "i"). Further, a circle 102 describes the outermost periphery of the light beams that are made incident into the photographing lens 10. Whether the pixel "Pi" is positioned outside the image circle 100 is determined based on Eq. (2).

$$R \leq \sqrt{(x_i + x_L)^2 + (y_i + y_L)^2} \quad (2)$$

In Eq. (2), the variable "$x_i$" denotes a distance between the center 101c of the effective pixel area 101 and the pixel "Pi", in the first direction "x". Further, the variable "$y_i$" denotes a distance between the center 101c of the effective pixel area 101 and the pixel "Pi", in the second direction "y". The variable "$X_L$" denotes a distance between the center 100c of the image circle 100 and the center 101c of the effective pixel area 101, in the first direction "x". The variable "$x_L$" corresponds to the first direction (x) component "sx" of the position "S", where the CCD 39a is moved to, in accordance with the quantity of the camera-shake. Similarly, the variable "$y_L$" denotes a distance between the center 100c of the image circle 100 and the center 101c of the effective pixel area 101, in the second direction "y". The variable "$y_L$" corresponds to the second direction (y) component "sy" of the position "S", where the CCD 39a is moved in accordance with the quantity of the camera-shake. Further, "R" denotes the radius of the image circle 100, which is arbitrarily selected based on the photographing lens characteristics and required image quality.

The right-hand side of Eq. (2) represents a one-line distance "PL" from the center 101c to the pixel "Pi". Whether the pixel "Pi" is positioned outside the image circle 100 is determined by comparing the distance "PL" with the radius "R".

When it is determined in Step S110 that the pixel, which is currently being processed, is positioned outside the image circle 100, the process proceeds to Step S112, and the variable "Gi" (which indicates the amount of times the pixel "Pi" has been counted outside the image circle 100) is incremented by "1", and then proceeds to Step S114. Note that, when it is determined in Step S110 that the current pixel is positioned inside the image circle 100, Step S112 is skipped and the process jumps to Step S114. In Step S114, the variable "i" is incremented by "1". The process then returns to Step S108 and the above-described processes are repeated.

When it is determined in Step S108 that the value of the variable "i" exceeds the total number "M" of the effective pixels, the process proceeds to Step S116, since the process of Step S110 and Step S112 has been carried out for all of the effective pixels of the CCD 39a after the execution of the camera-shake compensation operation. In Step S116, the variable "n" (the number of camera-shake compensation processes that have been carried out) is incremented by "1" and the process then returns to Step S102, so that the above-described processes are repeated.

When it is determined in Step S104 that the electric-charge accumulating period of the CCD 39a has passed, as a result of Eq. (1), the process proceeds to Step S118. In Step S118, the luminance compensation subroutine is carried out. In the luminance compensation subroutine, a luminance-correcting factor is calculated and the luminance of each pixel is corrected by the luminance-correcting factor.

Figure 8:
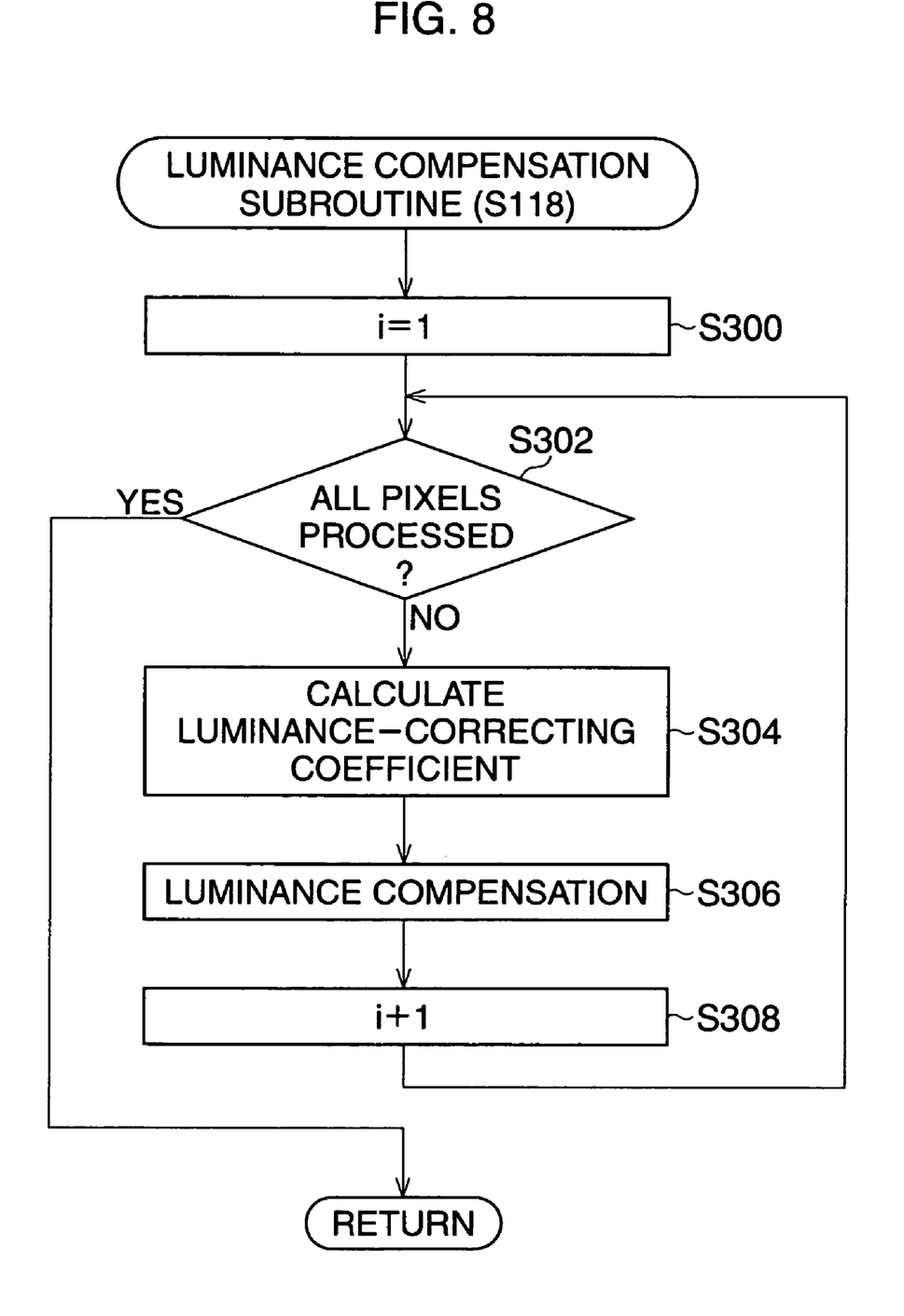
FIG. 8 is a flowchart of a luminance compensation subroutine.

FIG. 8 is a flowchart of the luminance compensation subroutine. In Step S300, a variable "i" which identifies each of the effective pixels and which indicates an effective pixel that is currently being subjected to the luminance compensation process, is set to "1". In Step S302, whether the luminance compensation subroutine has already been carried out for all of the effective pixels is determined by comparing the value of the variable "i" with the total number "M" of the effective pixels in the effective pixel area 101 of the CCD 39a.

When it is determined in Step S302 that there still remains a pixel or pixels that have not been processed, the process proceeds to Step S304. In Step S304, the luminance-correcting factor "Ki" for compensating for the luminance of the pixel "Pi" is calculated. The luminance-correcting factor is given by Eq. (3). Note that, a coefficient "k" in Eq. (3) is a predetermined luminance-correcting constant.

$$Ki = k \cdot \frac{Gi \cdot \Delta t}{Ts} \quad (3)$$

Next, the process proceeds to Step S306 and the luminance information of the pixel "Pi" is compensated based on the calculated luminance-correcting factor "Ki". For example, the luminance of the pixel "Pi" is amplified at the image-processing unit 22 by using the luminance-correcting factor "Ki", which is calculated in the CPU 20. The variable "i" is then incremented by "1" in Step S308 and the process returns to Step S302 to repeat the above-described processes. On the other hand, when it is determined in Step S302 that the processes from Step S304 to Step S306 have already been carried out for all of the effective pixels, the present luminance compensation subroutine ends. Further, the process then returns to Step S118 of FIG. 5, so that the luminance compensation operation ends.

As described above, according to the present embodiment, the luminance of the effective pixels of the CCD 39a that are located outside the image circle 100 of the photographing lens 10 is amplified. Therefore, enlargement of the photographing lens 10 is not required for the image circle 100 to sufficiently cover the maximum drive range of the CCD 39a, which is dependent to the mechanical structure of the movable section 30a. Namely, according to the present embodiment, an increase in the size of the photographing lens 10 of the digital camera 1 having the camera-shake compensation functionality is not required, while increasing the quality of an image obtained through the camera-shake compensation.

Figure 9:
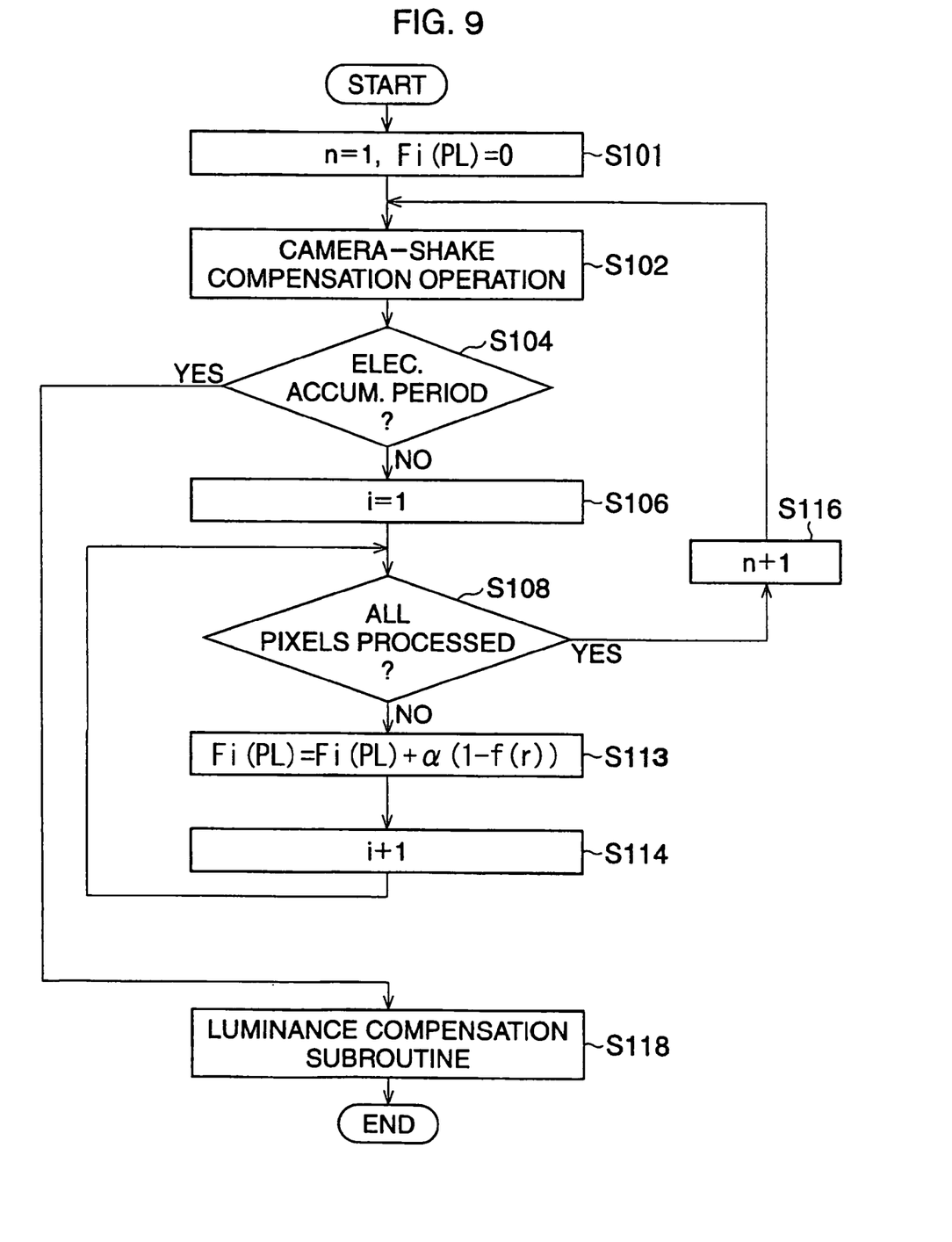
FIG. 9 is a flowchart of a luminance compensation operation of an alternate embodiment.

In the present embodiment, the luminance is amplified or corrected in accordance with the total time an effective pixel of the CCD 39a has been outside the image circle during the camera-shake compensation process, (this time correlates with the number of times each of the effective pixels is determined as being outside the image circle during the electric-charge accumulating period). However, information used in the luminance compensation is not limited to the above information. A distance of each effective pixel from the optical axis "OP" during the camera-shake compensation can also be incorporated into the correction of the luminance of the effective pixels. Namely, a distance related factor that can substantially counterbalance the luminance distribution (distribution of quantity of light) along the radial direction due to the characteristics of the lens system is introduced into Eq. (3), in place of the factor "Gi". For example, when the luminance distribution is defined as f(r) (where "r" is the radius), the distance related factor includes function $\alpha \times (1-f(r))$, where $\alpha$ is a lens dependent constant. More specifically, as shown in the flowchart of FIG. 9, in Step S113, the value of the distance related factor Fi(PL) is calculated for each of the effective pixels "Pi" by calculating $Fi(PL)+\alpha \times (1-f(PL))$ in turn. Further, in this alternate embodiment, the distance related factor Fi (PL), instead of "Gi", is multiplied in Eq. (3) in Step S304 of the luminance compensation subroutine shown in FIG. 8, so that the information relating to distance is included in the factor "Ki". Namely, in the alternate embodiment, Eq. (4) is used in place of Eq. (3).

$$Ki = k \cdot \frac{Fi(PL) \cdot \Delta t}{Ts} \quad (4)$$

Here, the processes in the flowchart of FIG. 9 are the same as those in FIG. 5, except for Step S100 and Step S112, which have been replaced by Step S101 and Step S113, and Step S110 which has been deleted. Note, in Step S101, the factor Fi(PL) is initialized to Fi(PL)=0 in place of the factor "Gi".

Note that, in the present embodiment, the camera-shake compensation operation is carried out during repetition of the luminance compensation operation, which is repeated every one ms after the release switch 13a is turned on. However, the procedure is not limited to that of the above-embodiment. The luminance information and the position information for each pixel may be stored in a memory while repeating the camera-shake compensation operation for every ms after the release switch 13a is turned on, so that the luminance can be corrected with respect to the data stored in the memory after the electric-charge accumulating period has passed.

Further, the factor "Ki" for each of the effective pixels can also be stored in the image memory 50 in relation with the image data, so that the luminance correction of the image data can be performed in an external device, such as a computer, after transmitting the image data and the factors "Ki" to the device.

Further, in the present embodiment, a digital camera that compensates for the camera-shake by driving the CCD 39a is chosen as an example. However, it is not restricted to this type of camera. The present embodiment can also be applied to a digital camera of the type having a camera-shake compensation optical system as a part of the photographing lens system, which is driven in order to counterbalance the detected camera-shake.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-186499 (filed on Jun. 24, 2004) which is expressly incorporated herein, by reference, in its entirety.

The invention claimed is:

1. A digital camera, comprising:
a camera-shake compensation mechanism configured to compensate for a camera-shake by adjusting a relative relation between a position of an optical axis of a photographing optical system and a center of image of a imaging device; and
a luminance compensation processor configured to compensate for luminance information of pixels of said imaging device, which are outside an image circle of said photographing optical system during a camera-shake compensation operation performed by said camera-shake compensation mechanism, the luminance compensation processor comprising a detecting processor configured to count a number of times each of said pixels is determined as being outside the image circle in said camera-shake compensation operation that is repeated at predetermined periods by said camera-shake compensation mechanism during an electric-charge accumulating period of said imaging device, and comprising a luminance information amplifier configured to amplify the luminance information of said pixels based on factors that are obtained for each of said pixels in accordance with the number of times each of said pixels is determined as being outside the image circle, the number of times being counted by said detecting processor.

2. A digital camera according to claim 1, wherein said detecting processor comprises:
a distance calculator configured to calculate a distance from a center of the image circle to a pixel of said imaging device;
a comparator configured to compare the distance calculated by said distance calculator and a radius of the image circle; and
a determination processor configured to determine whether the pixel is positioned outside the image circle in accordance with a result of the comparison performed by said comparator.

3. A digital camera according to claim 1, wherein said camera-shake compensation mechanism comprises:
a camera-shake detector configured to detect a quantity of camera-shake; and a drive mechanism configured to move said imaging device in a plane perpendicular to the optical axis, so that the camera-shake detected by said camera-shake detector is counteracted.

4. A digital camera according to claim 1, wherein said luminance compensation processor is configured to compensate for the luminance information based on the time in which each of said pixels has been outside an image circle of said photographing optical system during a camera-shake compensation operation performed by said camera-shake compensation mechanism.

5. A digital camera according to claim 4, wherein said luminance compensation processor is further configured to compensate for the luminance information with respect to a distance from the optical axis to a pixel of said imaging device when said imaging device is moved by the camera-shake compensation operation.

6. A digital camera, comprising:
  a camera-shake compensation mechanism configured to compensate for a camera-shake by moving an imaging device with respect to an optical axis of a photographing optical system;
  a calculator configured to calculate a distance from the optical axis to a pixel of said imaging device when said imaging device is moved by a camera-shake compensation operation of said camera-shake compensation mechanism; and
  a luminance compensation processor configured to compensate for luminance information of the pixel based on the distance calculated by said calculator, the luminance compensation processor comprising a detecting processor configured to count a number of times each of a plurality of pixels is determined as being outside an image circle of said photographing optical system in said camera-shake compensation operation that is repeated at predetermined periods by said camera-shake compensation mechanism during an electric-charge accumulating period of said imaging device, and comprising a luminance information amplifier configured to amplify the luminance information of said pixels based on factors that are obtained for each of said pixels in accordance with the number of times each of said pixels is determined as being outside the image circle, the number of times being counted by said detecting processor.

7. A method of luminance compensation, the method comprising:
  detecting a distance from an optical axis of a photographing optical system to a pixel of an imaging device while the imaging device is moved by a camera-shake compensation operation performed by a camera-shake compensation mechanism of a digital camera; and
  compensating for luminance information of the pixel by amplifying a luminance value in accordance with the distance, the compensating comprising counting a number of times each of a plurality of pixels is determined as being outside an image circle of said photographing optical system in the camera-shake compensation operation that is repeated at predetermined periods by the camera-shake compensation mechanism during an electric-charge accumulating period of the imaging device, and comprising amplifying the luminance information of the pixels based on factors that are obtained for each of the pixels in accordance with the number of times each of the pixels is determined as being outside the image circle, the number of times being counted by a detecting processor.

* * * * *